A. B. COLEMAN.
PLOW-HARNESS FOR HORSES.
No. 187,965. Patented March 6, 1877.
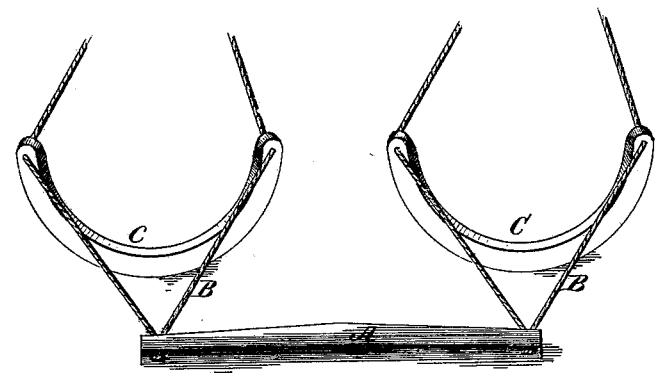
Witnesses.
Stephen Hale
Waterman Johnson
Inventor.
A. B. Coleman

UNITED STATES PATENT OFFICE.

AMBROSE B. COLEMAN, OF LYNDONVILLE, NEW YORK.

IMPROVEMENT IN PLOW-HARNESS FOR HORSES.

Specification forming part of Letters Patent No. 187,965, dated March 6, 1877; application filed June 1, 1876.

*To all whom it may concern:*

Be it known that I, AMBROSE BOOTH COLEMAN, of the town of Lyndonville, in the county of Orleans and State of New York, gentleman, have invented certain new and useful Improvements in Plow-Harness; and I do hereby declare that the following is a full, clear, and exact description of the same.

My invention comprises the combination of two semicircular stretch-bars, one long draw-lever, and four short tugs, (made of chains, straps, or ropes,) arranged in such a manner as to form a plow-harness for a span of horses for plowing, and more especially when plowing among fruit-trees, without barking them, and in stump land, its position while in use being under the horses' bellies, where it cannot touch trees or stumps as the horses pass them.

The figure shown in the drawing represents a back elevated view of my invention or plow-harness.

A is the draw-lever, with two of the tugs fastened to one end and the other two tugs at the other end. This lever works under the horses' bellies, about midway between the fore legs and the hind legs, with a clevis in the center to hitch to the chain, which is attached to the plow. B B are tugs, two at each end of the lever. The two tugs at each end of the lever separate, (one passes along one side and the other along the opposite side of each horse,) and are hitched into the tug-buckles in the place of other tugs, or may be extended farther forward and hitched into the hames. C C are two semicircular stretch-bars, which pass under the belly of each horse, at some distance in front of the draw-lever, with the ends of the bars fastened to the tugs, to stretch the tugs apart and keep them from rubbing the horses.

I claim as my invention—

The combination of the semicircular stretch-bars C C, the tugs B B, and the draw-lever A, all substantially as and for the purpose hereinbefore set forth.

Clayton, May 26, 1876.

A. B. COLEMAN.

Witnesses:
STEPHEN HALE,
WATERMAN JOHNSON.